United States Patent [19]
Monson et al.

[11] Patent Number: 5,210,944
[45] Date of Patent: May 18, 1993

[54] METHOD FOR MAKING A GAS TURBINE ENGINE COMPONENT

[75] Inventors: Paul J. E. Monson, Loveland; Todd J. Rockstroh, Maineville; Seetha R. Mannava, Cincinnati; Robert E. Baeumel, West Chester, all of Ohio

[73] Assignee: General Electric Company, Cincinnati, Ohio

[21] Appl. No.: 799,232

[22] Filed: Nov. 27, 1991

Related U.S. Application Data

[62] Division of Ser. No. 614,367, Nov. 13, 1990, Pat. No. 5,113,582.

[51] Int. Cl.$^5$ ............................................. B23K 27/00
[52] U.S. Cl. .................................. 29/889.2; 29/889.1; 29/889.7
[58] Field of Search .................. 29/889.1, 889.2, 889.7, 29/889.71; 264/25, 37, 80, 139, 340; 219/121.61, 121.66, 121.69, 121.72

[56] References Cited

U.S. PATENT DOCUMENTS

| | | | |
|---|---|---|---|
| 3,440,388 | 4/1969 | Otstot et al. | 219/69 |
| 3,503,804 | 3/1970 | Schneider | 131/1 |
| 3,588,439 | 6/1971 | Heller et al. | 219/121 |
| 3,657,510 | 4/1972 | Rothrock | 219/121 |
| 4,063,063 | 12/1977 | Funck et al. | 219/121 |
| 4,125,757 | 11/1978 | Ross | 219/121 |
| 4,128,752 | 12/1978 | Gravel | 219/121 |
| 4,156,124 | 5/1979 | Macken et al. | 219/121 |
| 4,219,721 | 8/1980 | Kamen et al. | 219/121 |
| 4,250,374 | 2/1981 | Tani | 219/121 |
| 4,319,122 | 3/1982 | Pope et al. | 219/121 |
| 4,324,972 | 4/1982 | Furrer et al. | 219/121 |
| 4,328,410 | 5/1982 | Slivinsky et al. | 219/121 |
| 4,368,080 | 1/1983 | Langen et al. | 134/1 |
| 4,617,085 | 10/1986 | Cole, Jr. et al. | 156/643 |
| 4,720,621 | 1/1988 | Langen | 219/121 |
| 4,756,765 | 7/1988 | Woodroffe | 134/1 |
| 4,803,021 | 2/1989 | Werth et al. | 264/25 |

OTHER PUBLICATIONS

Lambda Physik, Hans-Boeckler-Strasse 12, D-3400 Goettingen, West Germany, Material Processing with Excimer Lasers.
Lambda Physik, Lambda Laser, The UV-Tool for Industrial Applications (Marketing Brochure).
Lambda Physik, Excimer Lasers with Magnetic Switch Control.
Lambda Physik Highlights Nos. 1; 2; 3; 6, pp. 4; 7; Oct. 1986 to Oct. 1987.
Lambda Physik Industrial Report No. 4, Excimer Laser Material Processing-Methods and Results, Oct. 1988.
Lambda Physik Industrial Report No. 6, Excimer Laser Processing of Ceramic Workpieces, Jun. 1989.
Proceedings of Inter. Society for Optical Engineering vol. 998, J. Sercel et al., Excimer Beam Applications, pp. 76-83.
Society of Photo-Optical Instrumentation Engineers, vol. 1023, Excimer Lasers and Applications, 1988, pp. 141-152, 166-215, 236-241.

*Primary Examiner*—Irene Cuda
*Attorney, Agent, or Firm*—Charles L. Moore, Jr.; Jerome C. Squillaro

[57] ABSTRACT

A method for making a gas turbine engine component includes the steps of: providing an unfinished gas turbine engine component; directing a laser beam on a selected surface portion of the engine component to prepare the selected surface portion before at least one of a subsequent coating and bonding step; and depositing at least one layer of an abradable material, a subassembly of the component or a thermal barrier coating on the selected surface portion.

11 Claims, 4 Drawing Sheets

METHOD FOR MAKING A GAS TURBINE ENGINE COMPONENT

This application is a division of application Ser. No. 07/614,367, filed Nov. 13, 1990, now U.S. Pat. No. 5,113,582.

BACKGROUND OF THE INVENTION

The present invention relates to fabrication of gas turbine engine components and the like, and more particularly, to a novel method for preparing the surface of a gas turbine engine component or the like, for finishing, coating or bonding using an ultraviolet laser.

It is known that the roughness of a surface may be an important constituent in a bonding or coating operation. The surface texture or roughness provides a "mechanical key" for the coating material or adhesive used in the bonding operation, to facilitate the attachment of the coating material or bonding material layer to the parent material and to insure the structural integrity of the finished component.

Conventional methods of surface preparation, used in heavy industry, such as gas turbine engine manufacturing, basically include mechanical processes, such as grit blasting, honing, grinding and the like. Each of these methods involves contacting a surface with an abrasive medium; these methods typically are not easily controlled for very precise surface preparation, and would not generally be employed where a particular pattern is desired for forming a mechanical key. Conventional surface preparation methods can also introduce undesirable deformation or other damage into the surface or substrate; the abrasive material may become embedded in some parent materials or otherwise leave behind particulate contaminants or residue which will require an additional process step to clean the surface and remove any contaminants or residue.

The preparation and texturing of gas turbine engine components for subsequent bonding or coating operations is typically performed by grit blasting with aluminum oxide, followed by washing in acetone. This procedure frequently leaves small aluminum oxide particles embedded in the roughened surfaces. These embedded particles can have a detrimental effect on the integrity of the subsequently established bond between the bonded layer, or coating, and the component and can cause premature fatigue or failure of the component.

Preparation of surfaces for subsequent bonding or coating operations is becoming even more critical as nonmettallic composite materials, such as PMR-15 (a carbon or glass fiber composite with an organic amide resin), find greater application in devices subjected to high stress and heat, such as the components of a gas turbine engine or the like. Conventional surface preparation methods are generally inappropriate for composite-type materials for the same reasons previously discussed, and variations in the condition of the surface of these materials from one batch to another and between different suppliers may require special surface preparation before subsequent bonding or coating process steps to ensure uniformity and reliability of the finished component.

Components made of a composite material are typically molded. The unformed composite material is coated with a mold release agent so that it can be easily extracted from the mold after formation into the desired component. The mold release agent must be completely removed from the surface of the component to insure proper adhesion in a subsequent coating or bonding operation. Surface preparation is therefore particularly important in the fabrication of composite gas turbine engine components to insure reliability and a long service life.

The use of excimer lasers (ultra-violet lasers) for material processing, such as micro-machining and deposition of metallic and insulator films is described in marketing and technical literature published by LAMBDA PHYSIK GmbH, a leading manufacturer of excimer lasers, whose address is Hans-Bockler-Str. 12, D-3400, Gottingen, Federal Republic of Germany, and in U.S. Pat. Nos. 4,617,085; 4,756,785; 4,720,621; 4,368,080; 4,328,410; 4,219,721; and 4,128,752. None of these documents recognize the specific problems, as mentioned hereinabove, associated with preparing the surface of a gas turbine engine component, and in particular a component made of a composite material such as PMR-15, for a subsequent bonding or coating operation during the fabrication of a gas turbine engine component.

A related invention, disclosed in U.S. Pat. No. 5,120,395, entitled "A METHOD FOR MAKING A GAS TURBINE ENGINE COMPONENT WITH A TEXTURED SURFACE", and assigned to the same assignee as the present invention, discloses a method for selectively patterning a surface of an unfinished engine component by focusing a pulsed UV laser on selected locations of the component surface to form micro-pores therein. The micro-pores act as tiny lubricant reservoirs during engine operation to improve the distribution of lubricant between the patterned engine component surface and the surface of another engine component in contact with the patterned surface during engine operation.

SUMMARY OF THE INVENTION

It is accordingly a primary object of the present invention to provide a novel method for fabricating a gas turbine engine component which is not subject to the foregoing disadvantages.

It is another object of the present invention to provide a surface preparation method in which the surface is not contacted by an abrasive medium and which is controllable to avoid deformation or damage to the surface.

It is a further object of the present invention to provide a surface preparation method which does not require particulate abrasives, acids or solvents.

It is yet another object of the present invention to provide a method for texturing the surface of a gas turbine engine component to improve adhesive bond strengths or the adhesion of a subsequently deposited layer of coating material.

In accordance with the invention, a method for making a gas turbine engine component includes the steps of: provding an unfinished gas turbine engine component, which may be made of a composite material; and applying a laser beam on a selected surface portion of the engine component to prepare the selected portion for at least one of a subsequent coating, bonding, finishing step or attaching a subassembly of the component.

After preparing the surface by cleaning and/or texturing the surface with the laser beam, at least one layer of material may be applied to the surface by bonding or coating. The coating or bonded layer of material may be an abradable sealing material to protect the component from damage caused by the component contacting another engine component, such as the situation where a rotor blade comes into contact with the compressor casing of a gas turbine engine. The coating or bonded layer may also serve as a thermal barrier coating.

Other objects of the invention, together with features and advantages thereof, will become apparent from the following detailed specification when read with the accompanying drawings in which like reference numerals refer to like elements.

DETAILED DESCRIPTION OF THE PREFERRED EMBODIMENTS

Figure 1:
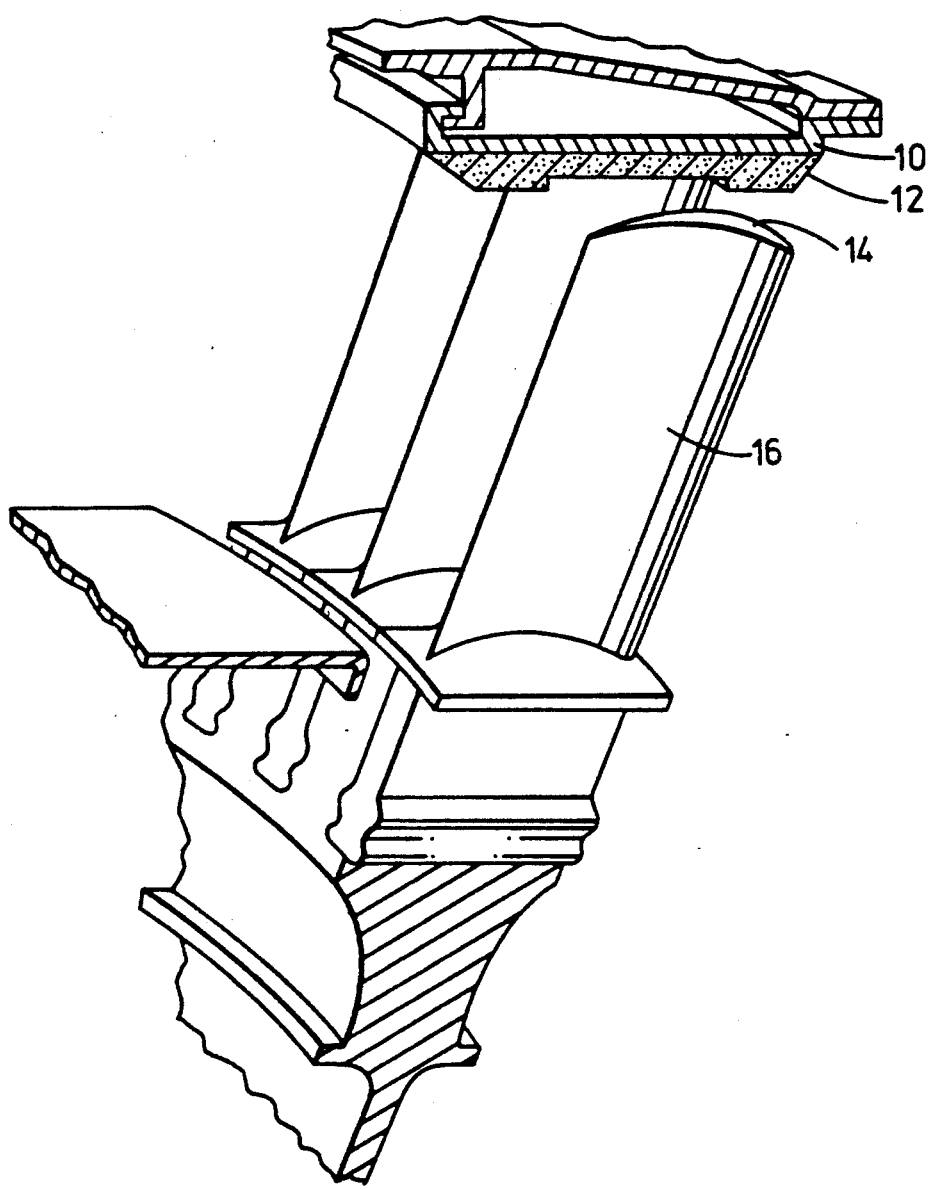
FIG. 1 is a perspective sectional view of a compressor section of a gas turbine engine.

One application of the present invention is in the fabrication of components such as fan casings, compressor and turbine blades and the like for a gas turbine engine. Referring to FIG. 1, a fan casing or compressor casing 10 is provide with a sealing layer or interior lining 12 of an abradable material, such as alumina silicate, an alumina organic mix or the like, which can be worn or abraded by the tip of a compressor blade 16 to establish a minimum working clearance between blade tip 14 and interior layer 12. The use of abradable materials as a lining and seal for a fan casing of a gas turbine engine is known. Such materials have been used to avoid damage due to the contact of rotor blades 16 with the interior wall of casing 10 and to further provide a seal between blades 16, which are rotating during engine operation, and the casing 10 which remains stationary. Adhesion of abradable layer 12 to casing 10 is of considerable concern, particularly as new materials, such as composite-type materials, become used more extensively in gas turbine engines to reduce weight, production and operating costs.

Additionally, blades 16 (in a high temperature turbine environment) may be coated with a thermal barrier coating (TBC) to protect the blades from the extreme heat and stress to which they are subjected during normal engine operation. To insure proper adhesion of the TBC, the blade surface must be clean and may be textured to provide a mechanical key.

Figure 2A:
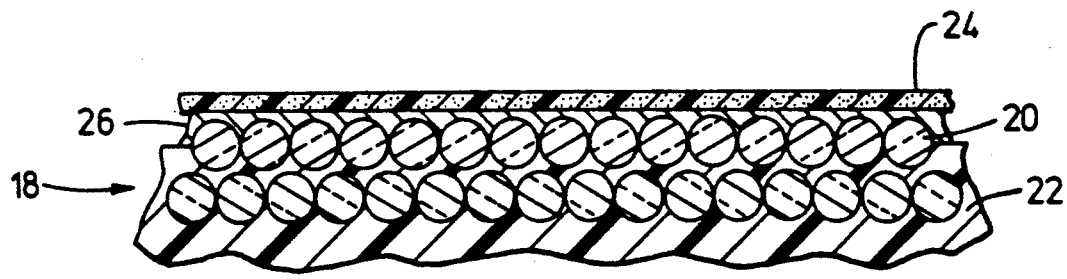
FIGS. 2A-2D are cross-sectional, side elevation views of the steps employed in the gas turbine engine component fabrication method in accordance with one embodiment of the present invention.

FIG. 2A illustrates a detailed cross-sectional view of a portion of a sheet 18 of a composite material which could be formed into a fan casing 10 or turbine blade 16 such as that illustrated in FIG. 1. The composite material is formed of a multiplicity 20 of fibers and an organic resin 22. The fibers are typically glass or a carbon-type material which may be woven (not shown in FIG. 2A) to form a mat of fiber material; successive layers of fibers 20 are laminated together by resin 22 to form sheet 18 of composite material which can be molded or shaped to form a desired configuration, such as a gas turbine engine component. Resin 22 is typically an organic amide resin. Sheet 18 may be PMR-15 which is a type of composite material which is used in the fabrication of gas turbine engines.

Before the sheet 18 of composite material is molded into a desired shape, a layer 24 of a mold release agent (a chemical which permits the engine component to be easily extracted from the mold after forming) is applied onto a surface 26 of sheet 18. After molding, some of the mold release agent material may remain on composite material surface 26 and must be removed before any subsequent processing of the composite material, such as applying a layer 28 (FIG. 2C) of abradable material or the like.

Figure 2B:
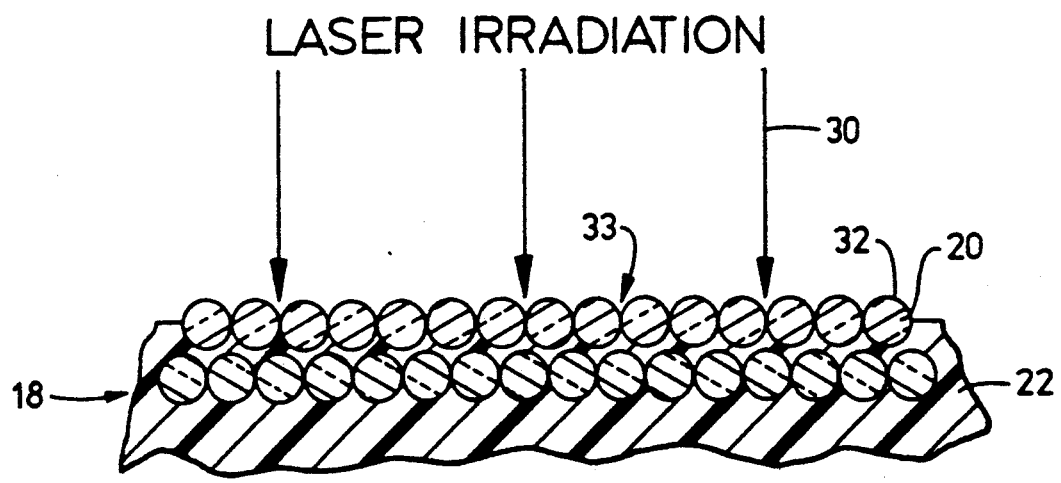

Referring also to FIG. 2B, in accordance with the present invention, release agent layer 24 and any other foreign or contaminant material, such as grease or oil, which may be on the surface of composite material 18 are removed and the surface cleaned by applying, imaging or focusing a pulsed ultraviolet (UV) laser beam 30 onto layer 24 and composite substrate surface 26 (FIG. 2A). Layer 24, together with any other contaminants and a portion of resin material 22 may be removed to expose at least a portion 32 of a layer of fibers 20 nearest surface 26 of the composite material.

In accordance with the present invention, laser beam 30 is pulsed with each pulse having a pulse width between about 1 and about 100 nanoseconds, preferably about 20 nanoseconds, and a wavelength between about 190 and about 350 nanometers. The wavelength may be selected by choosing the lasing gas mixture; for example, an argon flouride mixture will provide a wavelength of 193 nanometers and a krypton fluoride mixture will provide a wavelength of about 248 nanometers. The short wavelength is selected to provide a high photon energy which causes ablation of any foreign matter or debris on surface 26, such as layer 24, and ablation of resin 22 within the intersticies of fibers 20 in an exposed surface of layer 32, to provide a fibrous surface 33. The power density of the laser beam may be between about 0.5 joules/sq.cm. and about 100 joules/sq.cm., depending upon the type of materials being fabricated.

The UV laser is believed to actually break the chemical bonds in and between the release agent material molecules and between the resin material molecules but does not significantly affect the molecules of the fiber material; the fibers are selected so that they are ablatively removed at a much slower rate than the resin material. This process is essentially athermal (without heat) and therefore little heat is generated which can deform or damage the engine component molded from sheet 22. The exposed fibers 20 provide a textured surface which facilitates a subsequent bonding or coating step.

Figure 2C:
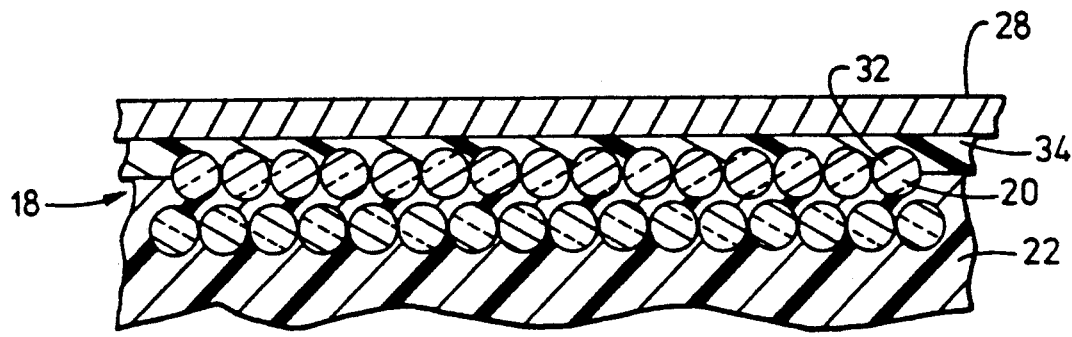

In accordance with one embodiment of the present invention, shown in FIG. 2C, if sheet 18 is formed into a component such as a fan casing 10 (FIG. 1) or the like, a layer of adhesive 34, similar in composition to resin 22, is applied to fibrous surface 33 of fiber layer 32 and a layer 28 of abradable material or an additional portion or subassembly of component 10 is thereafter applied over adhesive layer 34. Layer 28 may, therefore, be another segment or subassembly of the component. The subassembly 28 and casing are bonded in such a way as to provide a finished assembly.

In an alternate embodiment of the pre sent invention, if sheet 18 is formed into a component such as a blade, vane, blisk or similar gas turbine engine component, the layer 28 may be a thermal barrier coating (TBC) of a ceramic material to protect the engine component from the high heat and stress encountered during engine operation.

Figure 2D:
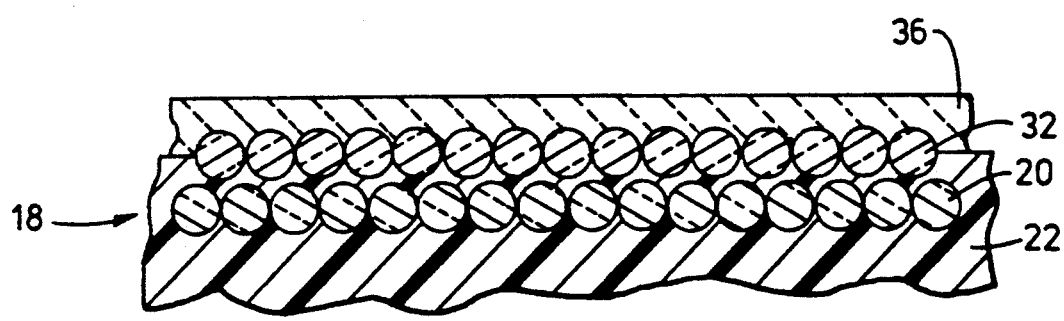

Referring to FIG. 2D, in a further embodiment of the present invention, a layer 36 of material may be deposited directly over the exposed layer 32 of fibers 20. Layer 36 may be an abradable material, a subassembly of the component, a thermal barrier coating or other type coating or bonding material depending upon what type of gas turbine engine component is being fabricated and what the function of that component will be.

While the present invention has been described with respect to the use of composite materials, the surfaces of other materials such as metals, ceramic materials or other type materials commonly used in gas turbine engines, may also be cleaned and textured using a UV laser pulsed at a pulse duration of about 20 nanoseconds to prepare the surface for subsequent fabrication steps, such as bonding, coating and the like.

Figure 3:
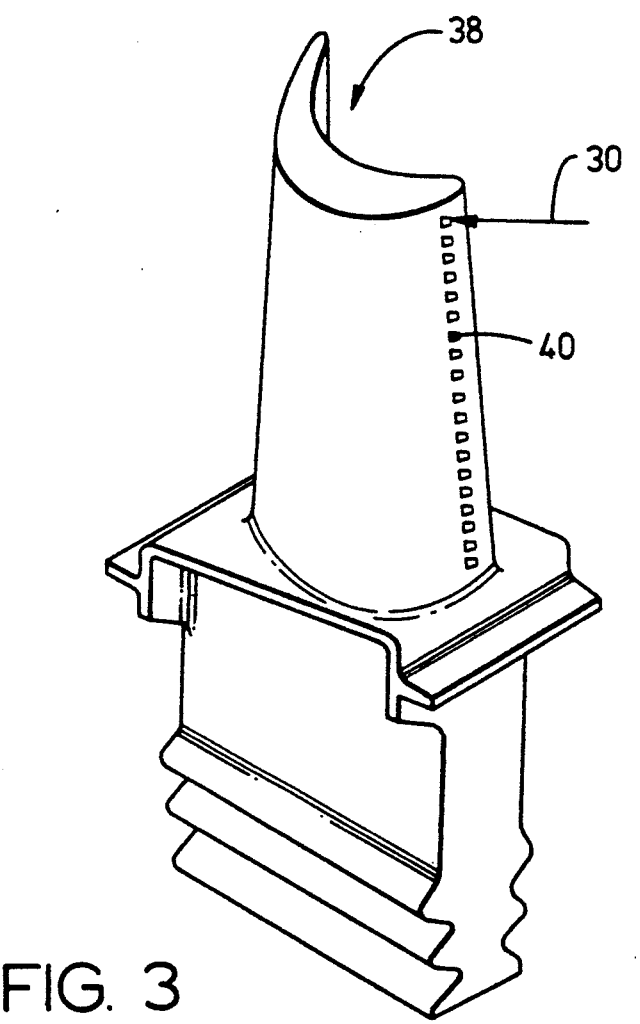
FIG. 3 is a perspective view of a gas turbine engine blade illustrating the steps employed in the blade surface preparation method in accordance with another embodiment of the present invention.

A further embodiment of the present invention is described with reference to FIG. 3. Some gas turbine engine components, such as blades, vanes and the like in a high temperature turbine environment, are coated with a ceramic thermal barrier coating (TBC), as described hereinabove, to protect the blade from the intense heat and stress encountered during normal engine operation. The cooling holes 40 formed in a gas turbine engine blade or vane may become obstructed when the TBC is deposited. In accordance with the present invention, a pulsed UV laser beam may be used to athermally remove or clean-out these TBC obstructions without deforming or damaging the airfoil. Laser beam 30 may be specifically focused on the locations of the cooling holes formed in blade 38 to remove any obstruction.

While the present invention has been described with respect to removing a thermal barrier coating from cooling holes 48 during fabrication, those skilled in the art will recognize that the invention is equally applicable to removing other coatings, bonded layers or other foreign material, such as dirt, soot and the like, from gas turbine engine components to facilitate repair of those components.

It will be readily understood by those skilled in the art that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A method for fabricating a gas turbine engine component, comprising the steps of:
   (a) providing a sheet of composite material including a multiplicity of fibers therein;
   (b) coating the composite material sheet with a mold release agent;
   (c) inserting the composite material sheet into a mold to form a desired shape of the engine component;
   (d) removing the engine component from the mold;
   (e) curing the engine component;
   (f) removing the mold release agent by focusing a laser beam on a surface of the engine component for a selected duration;
   (g) removing a layer of composite material from a selected area of the component surface to expose at least a portion of the multiplicity of fibers nearest the component surface in the selected area by focusing the laser beam on the selected area for a chosen duration; and
   (h) depositing at least one layer of material on the selected area.

2. The method of claim 1, wherein the at least one layer of step (h) is an abradable material.

3. The method of claim 1, wherein the at least one layer of step (h) is a thermal barrier coating.

4. The method of claim 1, wherein the at least one layer of step (h) is a subassembly of the component.

5. The method of claim 1, wherein the steps (f) and (g) each comprise the step of applying a pulsed UV laser beam on the component surface.

6. A method for fabricating a gas turbine engine component, comprising the steps of:
   (a) providing a sheet of composite material;
   (b) coating the composite material sheet with a mold release agent;
   (c) inserting the composite material sheet into a mold to form a desired shape of the engine component;
   (d) removing the engine component from the mold;
   (e) curing the engine component; and
   (f) removing the mold release agent by focusing a laser beam on a surface of the component.

7. The method of claim 6, further comprising the steps of:
   (g) removing a layer of composite material from a selected area of the component surface to expose at least a portion of a multiplicity of fibers of the composite material nearest the component surface in the selected area by focusing the laser beam on the selected area; and
   (h) depositing at least one layer of material on the selected area.

8. The method of claim 7, wherein steps (f) and (g) each comprise the step of applying a pulsed UV laser beam on the component surface.

9. The method of claim 7, wherein the at least one layer of material is an abradable material.

10. The method of claim 7, wherein the at least one layer of material is a thermal barrier coating.

11. The method of claim 7, wherein the at least one layer of material is a subassembly of the component.

* * * * *